UNITED STATES PATENT OFFICE.

AUGUSTE J. ROSSI, OF NEW YORK, N. Y., ASSIGNOR TO GEORGE H. ROBINSON, OF SAME PLACE.

LIQUID FOR THE PRODUCTION OF COLD.

SPECIFICATION forming part of Letters Patent No. 353,378, dated November 30, 1886.

Application filed July 8, 1885. Serial No. 171,009. (No specimens.)

*To all whom it may concern:*

Be it known that I, AUGUSTE J. ROSSI, of the city of New York, in the State of New York, have invented a new and useful Improvement in Liquids for the Production of Cold, which is set forth in the following specification.

Anhydrous sulphurous acid ($SO_2$) reduced by pressure to the liquid state, has its boiling-point at atmospheric pressure at 14° Fahrenheit, which makes it valuable for the production of cold. Its use in ice-machines has long been known. In this use of simple anhydrous sulphurous acid the liquefaction of the aspirated vapor or gas is effected in the condenser by pressure. Anhydrous sulphurous acid held in solution by sulphuric ether has also been used for the production of cold, according to the original binary method invented by C. M. Tessié du Motay and myself, and described in Patent No. 224,246, of February 3, 1880. In this use of anhydrous sulphurous acid its liquefaction is effected by mere absorption without pressure either in the refrigerator or in the condenser, where no more pressure is required than is sufficient to liquefy the aspirated vapor of sulphuric ether, of which the boiling-point is 95° Fahrenheit, and which, being formed, absorbs without pressure the vapor of the sulphurous acid. In practicing our binary method, carbonic acid or carbon dioxide ($CO_2$) is absorbed by sulphuric ether, and I have found, moreover, that it is absorbed by the solution of sulphuric ether and anhydrous sulphurous acid described in that patent, and each of these discoveries led to inventions which I have made the subjects of separate applications for patents. In a liquid state the boiling-point of carbonic acid is 102° Fahrenheit below zero. This makes it highly desirable for the production of cold. A pressure of seventy-five to eighty atmospheres, however, is required to liquefy carbonic acid; but upon the principle of our binary method, set forth in that Patent No. 224,246, I have found that carbonic acid is reduced to the liquid state and held in solution by absorption merely, without requiring any pressure.

The principle of my present invention is the discovery which I have made, that anhydrous sulphurous acid liquefied by pressure is a valuable absorbent, instead of being used alone, or used only as an absorbed gas, and that liquefied anhydrous sulphurous acid absorbs and holds in solution carbonic acid gas, the quantity absorbed being from two to three per centum of the weight of the anhydrous sulphurous acid at 14° Fahrenheit, and increasing as the pressure is increased; and my present invention relates to the use of the specific and improved binary liquid composed of liquefied anhydrous sulphurous acid holding carbonic acid in solution for the production of cold or ice. From extensive use of this improved binary liquid I have found that the cold produced by it is increased beyond that made by the use of the same weight of anhydrous sulphurous acid alone in the same apparatus to a very great extent. At the same time no more pressure, practically is required to make this improved binary liquid before it is aspirated from the refrigerator, or to reconstitute it in the condenser, than where anhydrous sulphurous acid is used alone, inasmuch as the carbonic-acid gas or the aspirated vapor of liquid carbonic acid is liquefied by mere absorption and dissolved in the liquefied sulphurous acid.

Compared with the solution of sulphuric ether and anhydrous sulphurous acid, where the ether is the absorbent and the sulphurous acid is the absorbed gas, I have found that the use of the solution of anhydrous sulphurous acid and carbonic acid, made by liquefying the sulphurous acid and dissolving the carbonic acid in it, produces a much greater amount of cold, indeed about twice as much as the same weight of the former solution in the same apparatus, and yet the pressure required to liquefy the anhydrous sulphurous acid or the aspirated vapors, though much greater than is required in the condenser in using the solution of sulphurous ether and anhydrous sulphurous acid, is far from sufficient to counterbalance the vast advantage attained by the enormous increase in the quantity of cold produced. The result of nearly doubling the quantity of cold produced, with an increase of pressure, requiring an increase of power expended, corresponding only to that of sulphurous acid over sulphuric ether, is a very great advantage in point of economy. Thus my present invention is related to our binary method described in Patent No. 224,246, as a binary liquid is used, and the liquid anhydrous sulphurous acid absorbs and holds in solution the carbonic-acid gas, and it is related to the old process of using anhydrous sulphurous acid alone, because the sulphurous acid, being gaseous at ordinary temperature, must be reduced to a liquid state by compression before it is introduced into the refrigerator; but it differs from each as a most valuable improvement.

The anhydrous sulphurous-acid gas is reduced to a liquid state by compression or cooling, or both, as is well known, and introduced into a carboy or other suitable receptacle, or it may be procured in the market in the liquid state contained in carboys for use in this process. The carbonic-acid gas, perfectly dry, obtained by any approved method, flows under high pressure from the vessel where it is generated into the carboy containing the liquefied sulphurous acid through a pipe extending nearly to the bottom of the carboy, whence the current of carbonic acid issues, and is absorbed and dissolved by the liquid sulphurous acid. The refrigerator of the ice-machine is then charged with the solution thus formed. If preferred, this solution may be formed in the refrigerator instead of a carboy, the liquid sulphurous acid having been first introduced into the refrigerator. During the absorption heat is evolved, and the carboy or refrigerator where the solution is formed should be cooled by a circulation of water, or by ice and salt around it, and the lower the cooling the greater will be the absorption of carbonic-acid gas under given pressure. By means of an exhaust and compression pump the solution is aspirated from the refrigerator, its evaporation producing intense cold, and the aspirated mixed vapor is forced into the condenser, cooled by a circulation of water around it to carry off the heat of compression and absorption, and is compressed under pressure sufficient to liquefy the vapor of sulphurous acid. The liquefied sulphurous acid in the condenser reabsorbs the vapor of the carbonic acid and holds it in solution, thus forming anew the original binary liquid, which is returned to the refrigerator through a pipe to be used again, and so on continuously.

Obviously a less quantity of carbonic-acid gas may be dissolved in a given weight of liquefied sulphurous acid at a given pressure and temperature than that which makes a saturated binary liquid, but with less beneficial result.

What I claim as new, and desire to secure by Letters Patent, is—

The improved binary liquid composed of liquefied anhydrous sulphurous acid and carbonic-acid gas absorbed and held in solution by it for the production of cold, substantially as described.

AUGUSTE J. ROSSI.

Witnesses:
WM. H. MOTT,
FRANCIS C. NYE.